UNITED STATES PATENT OFFICE.

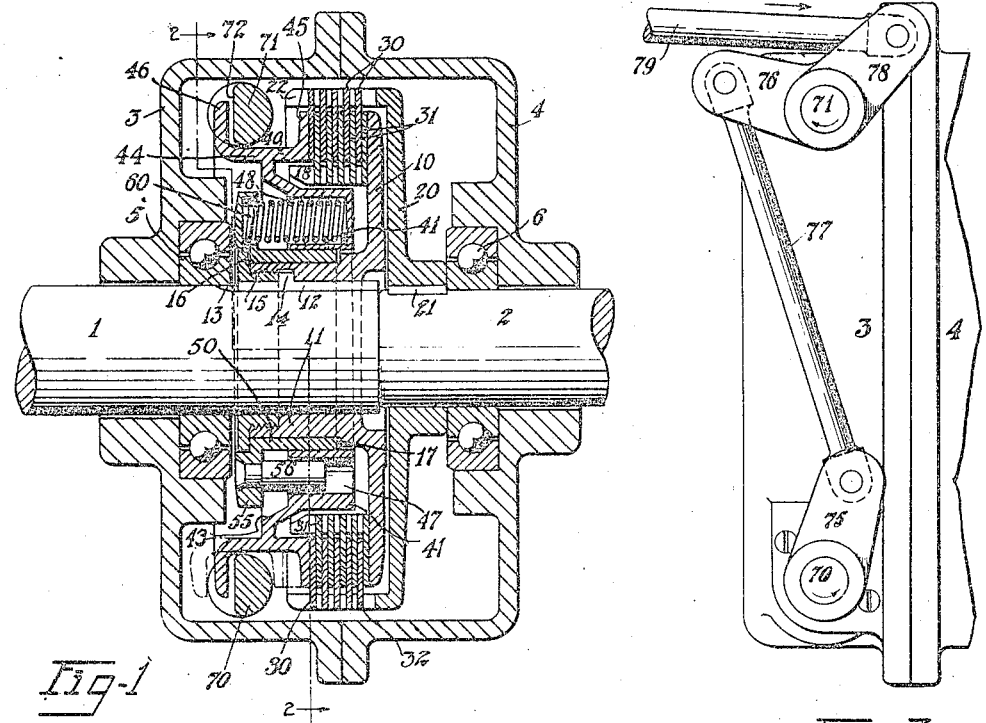
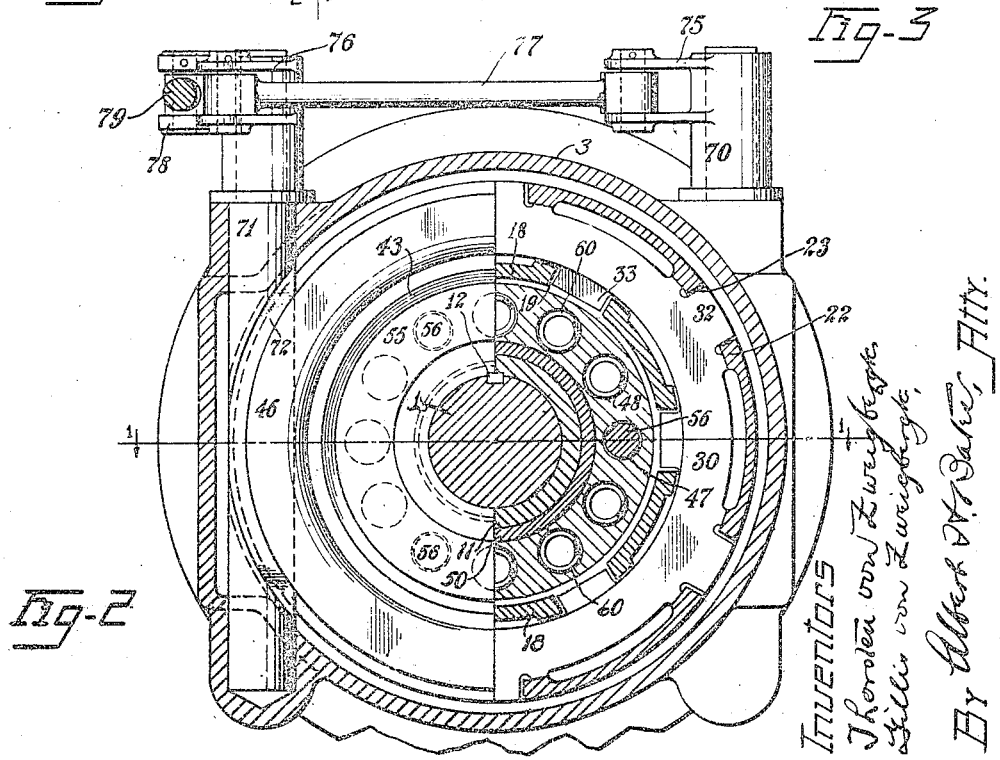

THORSTEN von ZWEIGBERGK, OF LANCASTER, AND GILLIS von ZWEIGBERGK, OF FUL-WOOD, ENGLAND; SAID GILLIS von ZWEIGBERGK ASSIGNOR TO SAID THORSTEN von ZWEIGBERGK.

FRICTION-CLUTCH.

1,281,741.   Specification of Letters Patent.   Patented Oct. 15, 1918.

Application filed November 11, 1915. Serial No. 60,844.

*To all whom it may concern:*

Be it known that we, THORSTEN VON ZWEIGBERGK, and GILLIS VON ZWEIGBERGK, citizens of the United States, residing at Lancaster, in the county of Lancaster, England, and at Fulwood, Preston, county of Lancaster, England, respectively, have invented a certain new and useful Improvement in Friction-Clutches, of which the following is a full, clear, and exact description, reference being had to the accompanying drawings.

The object of this invention is to provide a simple and efficient friction clutch adapted to avoid unnecessary friction, whether the clutch is engaged or disengaged. Our clutch is particularly well adapted for coupling alined shafts which, when the clutch is disengaged, may each rotate independently of the clutch. In clutches so employed there has usually been continuous friction between the rotating shiftable clutch member and the shifting mechanism, and there has also been friction at the thrust bearing for springs which seat the clutch. Our invention avoids the friction at each of these places, and provides a shifting mechanism which may be out of contact with any moving parts of the clutch, except at the instant of shifting into or out of engagement, and it provides for taking the thrust of both ends of the springs between rotating members when the clutch is engaged, and between stationary members when the clutch is disengaged, thus preventing wasteful friction under the spring pressure.

Our invention is especially well adapted for embodiment in a clutch of the multiple disk type seated by springs. It provides a rotatable member adapted to clamp disks carried respectively by driving and driven members under the influence of a spring. The mechanism which shifts this clamping member into idle position is normally out of contact therewith, thus avoiding any running friction at this point. Moreover, as soon as the shifting takes place this clamping member is brought into engagement with a stationary abutment, which receives the spring pressure and stops the clamping member, thereby relieving the driving and driven parts of any pressure of the spring.

Our invention is hereinafter more fully described in connection with a preferred embodiment thereof shown in the drawings and the essential features are summarized in the claims.

In the drawings, Figure 1 is a diametric section of our friction clutch as indicated by the line 1—1 on Fig. 2; Fig. 2 is a transverse section thereof on the offset plane indicated by the line 2—2 on Fig. 1. Fig. 3 is a view of the shifting mechanism, being a partial side elevation in a plane parallel with Fig. 1.

As shown in the drawings, 1 and 2 indicate a pair of alined shafts which our clutch is designed to couple. It is convenient to refer to the shaft 1 as the driving shaft and the shaft 2 as the driven shaft, but this direction of transmission may be reversed, if desired. 3 and 4 indicate the two parts of any suitable casing which respectively carry bearings for the respective shafts. As shown, the casing part 3 has a ball bearing 5 for the shaft 1, and the part 4 has a similar bearing 6 for the shaft 2.

Surrounding the driving shaft 1 and rotating with it is a member 10 having a hub 11 which carries a key 12 engaging the keyway 13 in the shaft 1. This key is shown as having a lug 14 extending into a recess in the hub 11 and is locked to such hub by a bushing 15 which screws into the hub and has an end flange 16. The key 12 is slidable in the keyway 13 for a slight distance, but compels the member 10 to rotate with the shaft 1. This member 10 has a radial portion carrying on its side concentric with the hub 11 an interrupted flange 18, the radial notches 19 in this flange forming seats for inward lugs on certain of the friction disks.

Rigidly mounted on the member 2 is the member 20, the key 21 being shown between the hub of the member 20 and the shaft. This member 20 has a radial disk-like portion, from the outer edge of which is an interrupted flange 22, the notches 23 in this flange forming seats for lugs on the other clamping disks.

30 and 31 indicate two sets of flat clamping rings, or disks, as they are ordinarily called. The rings or disks 30 have outward lugs 32 occupying the notches 23, and the disks 31 have inward lugs 33 occupying the notches 19. There are several of these flat rings in each set and the rings alternate, as will be well understood.

40 indicates a member adapted to clamp all of the rings against the member 10, thereby establishing driving communication between that member and the member 20, thus coupling the shafts 1 and 2 together. This member 40 is adapted to rotate when the clutch is engaged and be stationary when it is disengaged. It has a central hub or body 41 from which continues an outwardly flaring portion 43 terminating in a sleeve portion 44 which has two radial flanges. One of these flanges 45 provides the clamping abutment for the disk and the other flange 46 provides an abutment for the shifting mechanism, the shifting mechanism, as hereinafter described, lying in the groove between these two flanges.

The clamping member 40 described is mounted on the hub of an intermediate member or sleeve 50 which is journaled on the hub 11 of the member 10 and seats within the cylindrical recess on the outer face of that hub comprised between a shoulder 17 on the hub and the flange 16 of the bushing 15. This hub 50 is loosely mounted within this recess and capable of a slight longitudinal movement therein. The hub has a radial flange 55 which carries one or more studs 56 extending into corresponding recesses 47 in the body portion 41 of the member 40. Between the pins 56 and parallel with them and preferably equi-distantly mounted about the shaft are compression springs 60 which are held between the flange 55 and the member 40, being mounted in cylindrical recesses 48 in the body 41.

70 and 71 designate a pair of shafts which are mounted in the casing member 3 and extend outside thereof. Within the casing these shafts lie in the groove between the flanges 45 and 46. On the side toward the flange 46 they are flattened, as shown at 72. Suitable means is provided for rocking these shafts. The drawings show, for this purpose, an arm 75 on the shaft 70, and a double arm on the shaft 71, one portion 76 of this double arm being connected by a link 77 with the arm 75, and the other portion 78 being connected with a suitable operating rod 79.

It will be seen that a push on this operating rod, as indicated by the arrows in Fig. 3, will turn the shaft 71 in the right hand direction, and this movement, communicated by the link 77, will turn the shaft 70 in the left hand direction, thus causing the inner edge of the flattened portions 72 of both shafts to shove against the flange 46, thus withdrawing the clamping member 40 from engagement with the disks and compressing the springs 60. The contrary movement of the rod 79 operates to release the flange 46, enabling the springs to seat the clutch.

Fig. 1 shows the clutch seated, the shafts 70 and 71 being entirely out of engagement with the clamping member 40 and the springs taking their thrust at one end by the rotating member 40 and at the other end by the rotating member 50 which communicates the thrust to the rotating bushing 15 secured to the member 10. Accordingly, when the clutch is engaged, the springs exert no pressure against any non-rotating part, and the two clutch members 10 and 20, the disks 30, 31, the clamping member 40, the springs 60, and the member 50 all rotate as a unit.

To release the clutch a push is given along the rod 79, rocking the shafts 70 and 71 into engagement with the rotating clamping member 40. However, the instant these shafts release this running member from the disks they shove on the springs which transmit the motion through the flange 55 of the member 50, to the bushing 15, and from thence to the hub 11, and as this hub is slightly slidable on the shaft 1, all these parts are carried slightly toward the left (Fig. 1) until the flange 55 abuts the stationary portion of the bearing 5. This immediately stops the revolution of the member 50, the springs 60, and the member 40. The continued turning of the shafts then withdraws all pressure from the clutch disks, while binding the clamping member, under spring pressure, in stationary position. This leaves the bushing 15, and hence the hub 11 and member 10, free from any spring pressure, and accordingly the shaft 1 may rotate this member, together with the disks 31, without material friction with any stationary part or with the driven member.

Having thus described our invention, what we claim is:—

1. In a friction clutch, the combination with driving and driven members, of friction disks alternately connected with the driving and driven members, an independently rotatable clamping member adapted to clamp said disks against one of the members mentioned, and means for shifting the clamping member into disengaged position, said shifting means being out of contact with the clamping member when the clutch is engaged.

2. The combination with driving and driven members, of friction disks alternately connected therewith, an independently rotatable and slidable clamping member adapted to clamp the disks against one of the members mentioned, means tending to maintain the clamping member in engaged position, and means for withdrawing the clamping member from such position, said means being out of contact with the clamping member when it is engaged.

3. In a friction clutch, the combination of a driving member, a driven member, multiple disks alternately connected with the two members, a clamping member rotatable and slidable and adapted to clamp the disks against the driving member, a device rotatable with said driving member on the other side of the clamping member, springs between said device and clamping member tending to seat the clamping member, and means for moving the clamping member in opposition to the springs.

4. The combination with driving and driven members, of multiple disks alternately connected therewith, a clamping member adapted to clamp the disks between itself and one of the members first mentioned, said clamping member being rotatable when the clutch is engaged, springs movable with the clamping member for seating it, shifting means out of contact with the clamping member when the clutch is engaged, but movable into contact to engage the clutch, and means for stopping the rotation of the clamping member when the clutch is disengaged.

5. The combination with driving and driven members and means for causing engagement between them, of a shifting device comprising a pair of laterally spaced rock shafts having non-circular portions lying in an annular groove in the shiftable portion of the clutch.

6. The combination with driving and driven members, friction disks alternately connected therewith, of a clamping member for said disks having an annular groove, a pair of rock shafts journaled adjacent to their ends and having intermediate flattened portions occupying said groove, and means for rocking said shafts simultaneously.

7. In a friction clutch, the combination of a movable clamping member having an annular groove, a shifting device comprising a pair of parallel laterally spaced rock shafts having non-circular portions, said non-circular portions lying in said annular groove, and means for rocking the shafts simultaneously.

8. The combination with driving and driven members, friction disks alternately connected therewith, of a clamping member for said disks having an annular groove, springs forcing said clamping member into engagement position, a pair of rock shafts having flattened portions occupying said groove and out of contact with the clamping member when the same is engaged, and means for rocking said shafts simultaneously.

9. The combination with a clutch-member, of a shiftable and rotatable clamping member adapted to coöperate therewith, a sleeve rotatable with the clamping member, a spring between the sleeve and the clamping member tending to seat the clamping member, said sleeve surrounding the hub of said clutch-member and having a slight play longitudinally thereof, means for shifting the clamping member, and a stationary abutment which said sleeve is adapted to engage when the clamping member is shifted out of engagement.

10. The combination with driving and driven shafts, a driven member rigid on the driven shaft, a driving member keyed to the driving shaft but having a slight longitudinal movement thereon, friction disks alternately connected with the driving and driven member, a clamping member adapted to force said disks into engagement with the driving member, a sleeve rotatable with the clamping member, springs between the sleeve and the clamping member tending to seat the clamping member, said sleeve surrounding the hub of the driving member and having a slight play in an annular groove therein, means for shifting the clamping member into disengaged position, and a stationary abutment which said sleeve is adapted to engage when the clamping member is so shifted.

11. The combination with driving and driven members and means for frictionally connecting them together, of an independently rotatable member adapted to cause frictional engagement, and means for shifting said rotatable member in the direction to disengage the clutch, said shifting means being out of contact with said rotatable member when the clutch is engaged.

12. In a friction clutch, the combination with driving and driven members and means for frictionally connecting them, of a device additional to the driving and driven members and rotatable independently of either of them and serving to cause the frictional connection, said device consisting of two members with a spring tending to separate said two members, and means normally out of engagement with said device adapted to bear against one member thereof to move it to release the clutch.

13. In a friction clutch, the combination with driving and driven members, of friction disks alternately connected to said members, a device rotatable independently of either of said members and adapted to clamp the disks against one of the members, said device consisting of two parts and a spring tending to move them relatively to each other, means normally out of engagement with one part of said device but adapted to bear against such part to move it to release the clutch, and an abutment into engagement with which the other part of the device is brought by the disengaging movement of said means.

14. In a friction clutch, the combination of a rotatable driving member, a rotatable driven member, one of said members having a slight longitudinal movement, an independently rotatable clamping member, a fourth member rotatable with the clamping member, a spring between said clamping member and said fourth member, a connection between said fourth member and the member mentioned as having a slight longitudinal movement, and an abutment for said fourth member which that member is adapted to engage when the clutch is disengaged.

15. In a friction clutch, the combination of a driving member, a driven member, multiple disks alternately connected with the two members, a clamping member rotatable and slidable and adapted to clamp the disks against one of said members and provided with pockets facing away from such member, a device rotatable with said clamping member, springs between said device and clamping member seating in said pockets and tending to force the clamping member into engagement, and means for moving the clamping member in opposition to the springs.

In testimony whereof we hereunto affix our signatures.

THORSTEN von ZWEIGBERGK.
GILLIS von ZWEIGBERGK.